United States Patent [19]

Ury et al.

[11] 4,269,581
[45] May 26, 1981

[54] APPARATUS FOR MOLDING THERMOSETTING MATERIAL

[75] Inventors: Michael G. Ury, Bethesda; Patrick J. Ryan, Laurel, both of Md.

[73] Assignee: Fusion Systems Corporation, Rockville, Md.

[21] Appl. No.: 75,599

[22] Filed: Sep. 14, 1979

[51] Int. Cl.³ .............................................. H05B 9/00
[52] U.S. Cl. ......................... 425/174.4; 219/10.55 A; 219/10.55 F; 264/25; 264/26; 264/DIG. 46; 425/174.8 R
[58] Field of Search ................... 264/25, 26, DIG. 46; 425/174, 174.4, 174.8 R; 219/10.55 R, 10.55 A, 10.55 F, 10.55 M, 10.55 D

[56] References Cited

U.S. PATENT DOCUMENTS

| 3,465,114 | 9/1969 | Bleackley et al. | 219/10.55 A |
|---|---|---|---|
| 3,519,517 | 7/1970 | Dench | 264/26 |
| 3,731,038 | 5/1973 | Bosisio | 219/10.55 A |
| 3,732,048 | 5/1973 | Guerga et al. | 425/174.4 |
| 3,843,861 | 10/1974 | Van Amsterdam | 219/10.55 A |
| 3,942,058 | 3/1976 | Haugsjaa et al. | 313/44 |
| 3,942,068 | 3/1976 | Haugsjaa et al. | 315/39 |
| 4,018,642 | 4/1977 | Pike et al. | 156/272 |
| 4,083,901 | 4/1978 | Schonfeld et al. | 264/25 |

Primary Examiner—Jeffery R. Thurlow
Attorney, Agent, or Firm—Pollock, Vande Sande & Priddy

[57] ABSTRACT

An apparatus and method for molding thermosetting material into shaped articles rapidly and without the occurrence of hot spots or other defects. A mold having a cavity conforming to the shape of the article to be molded is provided and is filled with thermosetting material. An energy source generates electromagnetic energy in the microwave range and a coupling means is provided for causing the electric field component of the generated energy to uniformly irradiate the volume of thermosetting material in the mold cavity.

20 Claims, 4 Drawing Figures

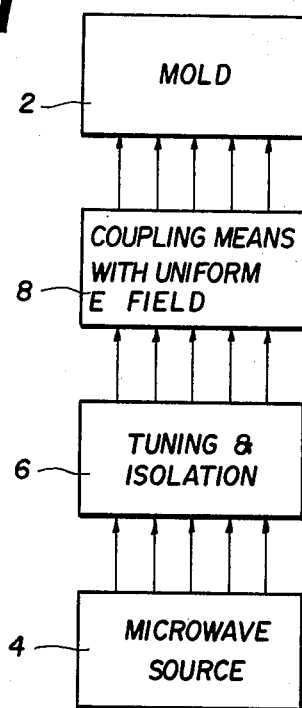
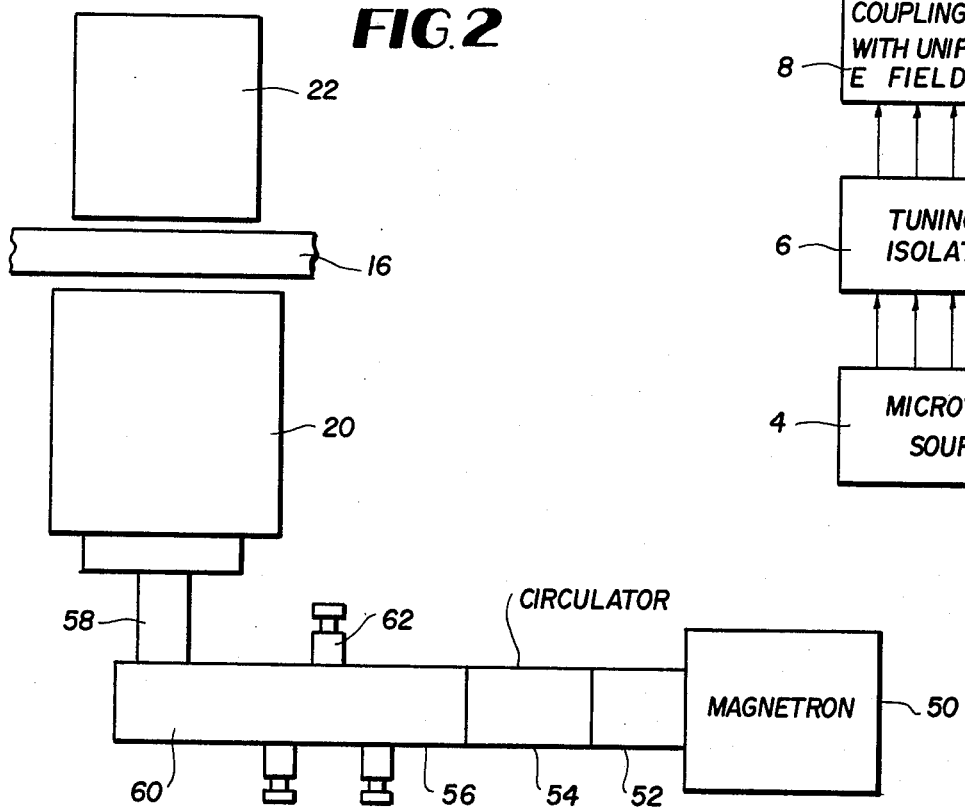
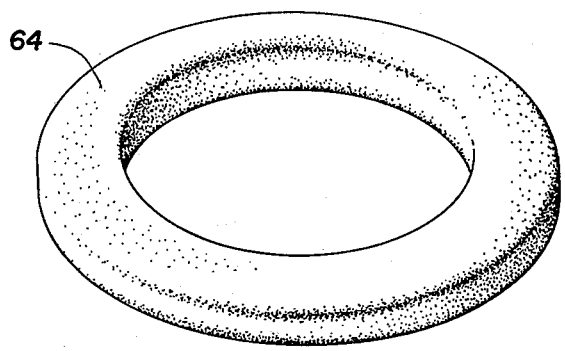

APPARATUS FOR MOLDING THERMOSETTING MATERIAL

The present invention is directed to an apparatus and method for molding thermosetting materials into shaped articles. More specifically, it is directed to an apparatus and method for achieving such molding extremely rapidly and without the occurrence of hot spots or other imperfections in the molded articles.

As is known, thermosetting materials, or thermosets as they are also called, are normally in the liquid or semi-viscous state and have the property of efficiently setting upon the application of heat. One conventional process for molding thermosetting materials entails curing the material in a heated metallic mold of desired shape. In this process, the heat is transmitted to the material by conduction and the article sets to a shape conforming to that of the mold. While the quality of the products produced by this prior art method may be acceptable, its drawback is that it is too slow. For example, when employed in the molding of O-rings such as the ostomy sealing rings which are discussed below, it normally takes more than about 30 seconds to cure each ring, which places a stringent limitation on the number of articles which can be produced per machine hour.

Microwave heating is inherently faster than conductive heating for appropriate materials. While this form of heating has been applied to other fields, to applicant's knowledge it has not heretofore been successfully employed in the curing of thermosetting materials in a mold. For example, it is possible that microwave heating has been advantageously employed to cure slurries in plaster molds to produce bathroom appliances and also to melt thermoplastic material before injection. However, attempts at curing thermosets, which to applicant's knowledge have primarily utilized microwave ovens or similar structures, have not been successful due to the formation of hot spots or inconsistencies in the molded articles. These hot spots have formed because of the fact that microwave ovens produce non-uniform fields in their interiors and with the use of such structures it has not been possible to irradiate the volume of thermosetting material in the mold uniformity. While attempts have been made to increase the field uniformity such as by using mode stirrers or by placing several microwave sources in an oven chamber, attainable field uniformity is not high enough to suitably mold thermosets. The hot spots which may result degrade the physical and mechanical characteristics of the articles and make them unsuitable for commercial use.

In accordance with the present invention an apparatus and method for successfully molding thermosetting material with microwave energy is provided. Microwave energy is generated by an electromagnetic source and an electromagnetic coupling means is provided for coupling a uniform electric field to the entire volume of thermosetting material to be molded.

The coupling means may be comprised of a transmission line, and more particularly of a transmission line which is configured in the shape of the article to be molded and which is arranged to transmit and couple an electric field component which is circumferentially uniform with respect to the elements of the line when excited.

It is thus an object of the invention to provide an apparatus and method for molding shaped articles of thermosetting material extremely rapidly.

It is a further object of the invention to provide an apparatus and method for molding thermosetting material into articles which are devoid of hot spots and other defects.

It is still a further object of the invention to provide an apparatus and method for molding thermosetting material in which a high quality product is formed at a relatively low molding temperature.

It is still a further object of the invention to provide an apparatus and method for molding as described above in which the mold is reusable.

It is still a further object of the invention to provide an apparatus and method for molding as described above in which the mold does not get hot.

The above objects are accomplished by providing a mold having a cavity which conforms to the shape of the article being molded. The cavity is filled with thermosetting material and a source for generating microwave energy is provided. After suitable tuning and isolation has been effected, at least a portion of the generated microwave energy is coupled to the material to be molded in such manner that the entire volume of material is irradiated by a uniform or essentially uniform electric field. The resulting article is high in quality and is free of hot spots and other imperfections.

The invention will be better understood by referring to the accompanying drawings in which:

FIG. 1 is a block diagram of the present invention.

FIG. 3 is an illustration of exemplary microwave hardware for supplying microwave power to the embodiment depicted in FIG. 2.

FIG. 4 is an illustration of an article which may be molded by the embodiment shown in FIG. 2.

Figure 2:
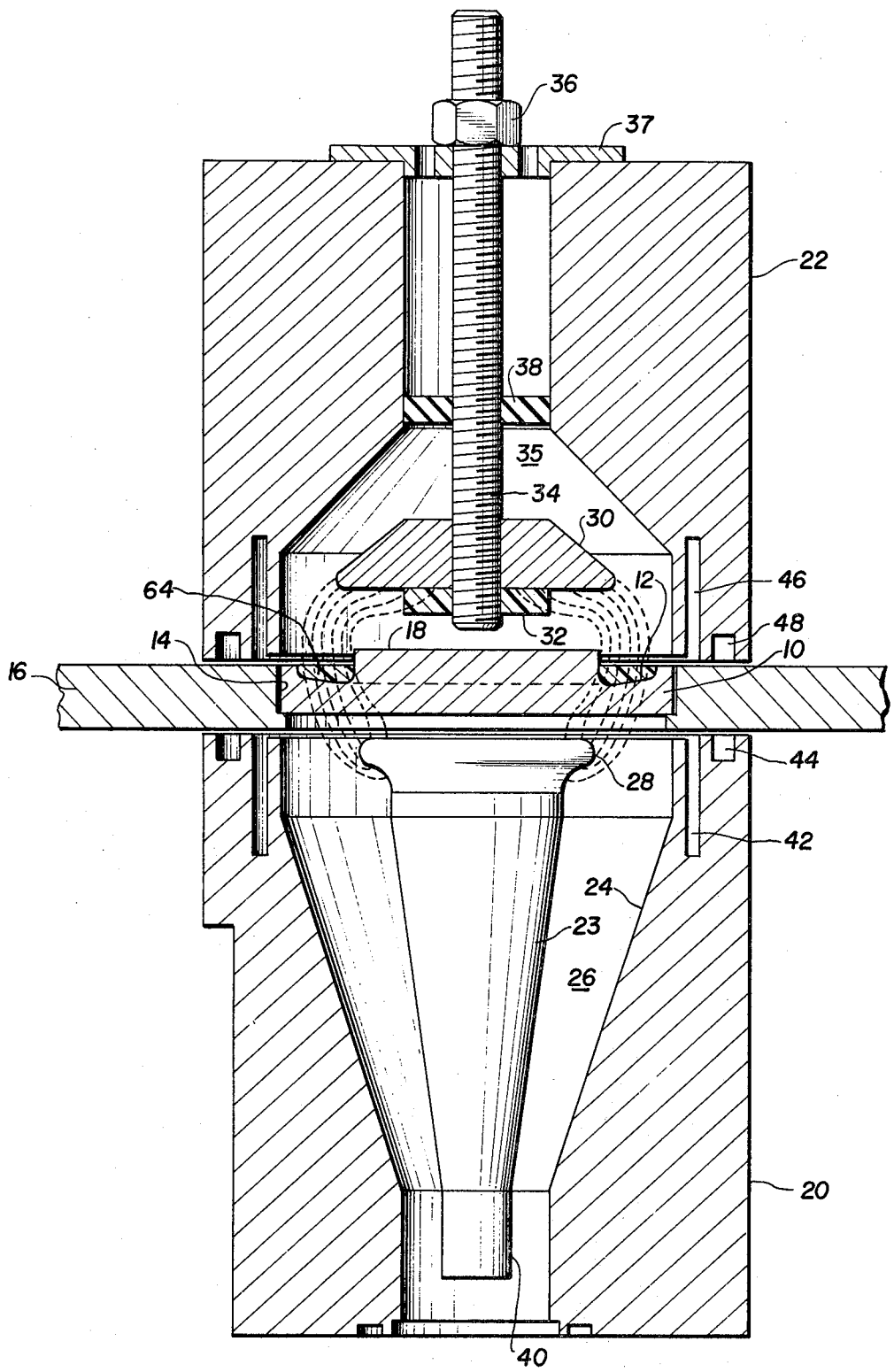
FIG. 2 is a drawing of an illustrative embodiment of the present invention.

The present invention is illustrated in FIG. 1. Referring to that figure, mold 2 is a dielectric mold having thermosetting material in its mold cavity. Microwave energy is generated by conventional microwave source 4. After tuning and isolation is effected at block 6, at least a portion of the generated energy is coupled to the thermosetting material by coupling means 8 which is arranged to couple an electric field component which is uniform or very near uniform throughout the volume of material to be set.

Coupling means 8 may be comprised of a transmission line having a shape in cross-sectional planes which are perpendicular to the transmission axis, which is similar or congruent to the shape of a cross section of the article being molded and further having the property of transmitting an electric field which is circumferentially uniform with respect to the elements of the line when appropriately excited. Thus, a uniform electric field is shaped and "fitted" to the mold cavity to uniformly cure the thermoset.

For example, if a ring-shaped or disc-shaped article is being cured a coaxial line having conductors of circular cross section may be utilized. As is known the electric field propagates between the two conductors of the coaxial line in the TEM mode and is circumferentially uniform with respect to the conductors. On the other hand if an article of polygonal or arbitrary cross section is being cured then a coaxial line having inner and outer conductors of polygonal or arbitrary shape respectively may be used and again the field will be approximately circumferentially uniform although in the case of non-circular geometries there may be field enhancement effects at the corners which can be modified by field attenuation or modification means. It is to be understood that the term "circumferentially uniform" as used herein is to be interpreted broadly and is to apply to uniformity which peripherally encircles or is encircled by polygonal transmission elements and transmission elements of arbitrary cross-sectional shape as well as circular or cylindrical shape.

Also, transmission lines other than coaxial lines, such as appropriately shaped waveguides may be utilized, and dielectric liners may be used in connection with these to concentrate and shape the field energy. Waveguides transmit fields which are circumferentially uniform with respect to the waveguide element when appropriately excited, such as for example a cylindrical waveguide excited in the TMOI mode.

The coupling means 8 in FIG. 1 may further include a field shaping means to shape the field lines which are emitted by the transmission line to effect a more perfect "fit" into the mold cavity and to maximize the energy which is coupled to the thermoset.

The invention may be utilized to cure different types of thermosetting material, and it should be understood that the term "thermosetting material" or "thermoset" as used herein is not limited to thermosetting plastic resins but more generally refers to moldable materials which may be set by the application of uniform or essentially uniform microwave heating and in which the setting reaction involves polymerization, cross-linking, gelation, solvation and other organic setting reactions.

FIG. 2 is an illustration of a specific embodiment of the invention described above which is particularly adapted for molding rings. It should be understood that this specific embodiment is presented for purposes of illustration only and that as indicated above the invention may be used to mold articles of varying configuration.

Referring to the figure, mold 10 is provided, which has an annularly shaped mold cavity 12. The mold is made of a dielectric material and is inserted in a recess 14 in table 16, which as is known, may be a rotating table which is part of an overall molding machine which automatically performs respective steps such as loading, molding, removal of irradiated material, etc. at different rotative positions of the table.

The microwave heating apparatus is comprised of lower and upper metallic cylinders 20 and 22, each of which is mounted so as to be slightly spaced from table 16 when heating is taking place. Although not shown in the drawing, the upper and lower cylinders may be connected to each other so that the structure resembles a large C-clamp, or in the alternative other conventional mechanical expedients may be used to mount the cylinders.

Microwave energy is fed to the bottom of the lower cylinder by the microwave generation and transmission network shown in FIG. 3, or by other conventional microwave equipment. The purpose of the structure shown in FIG. 2 is to couple the microwave energy to the thermosetting material in the mold cavity as efficiently and uniformly as possible.

Coupling is effected by the coaxial impedance transformer, comprised of conically shaped inner and outer conductors 23 and 24 respectively. The transformer is a form of coaxial line having tapered elements for effecting an impedance transformation to provide good impedance matching to the dielectric load. The electric field propagates in the gap between the inner and outer conductors and due to the coaxial geometry of the device is circumferentially uniform.

The top 28 of the center conductor 23 has a flange-like or "hat" shape as shown in the figure. Field lines are emitted from the "hat" approximately as shown, and hence are directed towards and through the mold cavity.

Chamber 35 of top cylinder 22 is a wave guide beyond cutoff and a field shaping means comprised of the combination of truncated conical metallic member 30 and cylindrical dielectric member 32 are disposed therein. The field shaping means is mounted on a dielectric rod 34 which, for example, may be made of Teflon and which is suspended from the top of cylinder 22 by nut 36. An insulating spacer 38 is used to properly position the dielectric rod, and in the illustrative embodiment field shaping component 30 is made of aluminum while component 32 is made of Teflon.

The microwave enclosure illustrated in FIG. 2 is of relatively low Q-design so as to accomodate a range of microwave frequencies without changing enclosure dimensions. If desired, a higher Q enclosure may be used in which case the precise frequency of operation becomes more significant.

In the operation of the apparatus, mold cavity 12 is filled with thermosetting material 64 either by an operator or by an automatic filling means. As known to those in the art, if automatic ejection of the mold is to be easily employed, a liner may be inserted in the mold cavity before the thermosetting material is poured in. As mentioned above, lower cylinder 20 is mounted so as to be spaced slightly from table 16, which distance is 1/32 of an inch in the illustrative embodiment. In the heating position shown in FIG. 2, top cylinder 22 is spaced the same distance from the top of the table as lower cylinder 20 is spaced from the bottom of the table. Since the particular mold shown in the illustrative embodiment has a projection 18 the top cylinder is made movable by conventional mechanical means not shown, and in the non-heating position is raised to allow projection 18 to clear the bottom of the top cylinder as table 16 rotates. If a mold which does not have a projection such as 18 is utilized, the top cylinder could be permanently mounted in the molding position and would not have to be made movable.

Microwave energy is fed to the bottom end 40 of the coaxial impedance transformer 23, 24 and as discussed above propagates up the impedance transformer to flange or "hat" portion 28. The "hat" is shaped so as to emit a circumferentially uniform electric field which is directed towards mold cavity 12. The field shaping means comprised of elements 30 and 32 provides a termination for the field lines emitted by "hat" portion 28 and constrains the field lines to remain within the area bounded by the mold cavity. Dielectric member 32 "attracts" the field lines to help shape them approximately as shown. The field shaping means enhances field uniformity in the radical direction and also causes out of phase field components which otherwise would be reflected back into the mold cavity to be minimized, thus maximizing the energy which is absorbed by the thermosetting material in the mold cavity.

While a field shaping means of specific configuration is disclosed in the illustrative embodiment of FIG. 2, it should be understood that other specific field shaping means may also be utilized and are within the scope of the invention. The optimum field shaping means for any given application may be determined empirically.

In order to prevent microwave leakage from the assembly shown in FIG. 2, quarter wave choke shorting sections 42 and 46 as well as cylindrical lossy ferrite sections 44 and 48 are disposed in the bottom and top cylinders respectively. The choke sections are merely open slots of ¼ wave length which are located as illustrated in the figure while the lossy ferrite sections are comprised of ferrite material inserted in the shallow slots depicted. If desired, other known expedients may be employed to minimize leakage.

FIG. 3 illustrates exemplary microwave hardware for supplying energy to the molding apparatus of FIG. 2. Microwave energy source 50, which is a magnetron or other conventional source feeds energy to wave guide section 52 which is connected to circulator 54, the function of which is to effectively isolate the source from the load. Energy from the circulator 54 is fed to wave guide section 56 through a tuner 62 used to match out reactive components in the load and from there is fed to wave guide to coaxial transition section 60 which connects coaxial cable 58 with rectangular wave guide section 56. The coaxial cable is connected with the lower portion 40 of bottom cylinder 20 in FIG. 2 to supply energy to the molding apparatus. All of the above-described hardware is conventional and forms no part of the present invention.

In an actual embodiment built according to the design of FIG. 2, a microwave source of 2450 MhZ ±50 MhZ was used to irradiate and cure one to three inch rings of thermosetting material. A power density of approximately 5 to 10 watts per c.c. was fed to and absorbed by the material.

The articles produced by the embodiment of FIG. 2 are of high quality and are devoid of hot spots and other imperfections. Moreover, they are produced in a molding time of less than two seconds as opposed to more than thirty seconds in the prior art. Additionally, the articles are set at a lower temperature than with the prior art conductive heating method which is an advantage in that they are cool enough to be handled by personnel immediately after molding. Further, while in the prior art the mold itself became very hot, in accordance with the present invention, a dielectric mold having a low loss tangent may be used in which case the mold will stay relatively cool even though it is used repeatedly. It should be noted that the invention finds primary use in curing relatively thin articles, as with thicker articles the standing wave pattern of the microwave energy at practical frequencies may cause non-uniformities in the thickness direction.

FIG. 4 is an illustration of the article which is molded when the exemplary mold shown in FIG. 2 is used. The article is an O ring 64 and for example may comprise an ostomy device sealing ring which is part of an ostomy appliance. The function of the sealing ring is to interface with and seal the part of the body to which the appliance is connected, and as may be appreciated, it is important for a ring which is used for this purpose to be free of imperfections and mechanically sound. As mentioned above, FIG. 4 is presented for purposes of illustration only, as a variety of other specific articles may be molded by the apparatus of the invention.

It further should be understood that while we have described certain embodiments of our invention, we wish it to be understood that we do not intend to be restricted thereto, but rather intend to cover all variations, modifications and uses which come within the spirit of the invention, which is limited only by the claims appended hereto.

We claim:

1. An apparatus for molding articles of thermosetting material rapidly, uniformly, and without the occurence of hot spots or other defects comprising, a mold including a mold cavity which conforms to the desired shape of said articles for receiving said thermosetting material, means for mounting said mold in said molding apparatus, means for generating electromagnetic energy of microwave frequency, transmission line coupling means located on one side of said mold cavity for coupling the electric field component of said generated electromagnetic energy to said cavity in a manner such that said field penetrates through said cavity uniformly or essentially uniformly throughout the cavity volume, said transmission line coupling means comprising means for transmitting an electric field which is circumferentially uniform with respect to the transmission element or elements of said line when excited with said electromagnetic energy and having a longitudinal transmission axis and a shape in cross-sectional planes perpendicular to said axis which is similar to the shape of a cross-sectional plane of said article being molded, and discrete field shaping means disposed on the other side of said mold cavity from said transmission line coupling means for providing a termination for said electric field lines penetrating through said mold cavity, thereby tending to maximize the electric field which is directed through said cavity.

2. The apparatus of claim 1, wherein said transmission line coupling means has an end for receiving electromagnetic energy and an end adjacent said mold cavity for coupling said radiation thereto.

3. The apparatus of claim 1 further including a microwave chamber disposed on said other side of said mold, said field shaping means being disposed in said microwave chamber.

4. The apparatus of claims 1 or 3, wherein said field shaping means comprises a shaped member which is mounted in axial alignment with said transmission line.

5. The apparatus of claim 1 wherein said transmission line is a coaxial transmission line.

6. The apparatus of claim 5 wherein said mold cavity is annular in shape and wherein the shape of cross-sectional planes of said coaxial transmission line perpendicular to the axis of said line are circular.

7. The apparatus of claim 1 wherein said transmission line comprises a coaxial impedance transformer having conically shaped inner and outer conductors.

8. The apparatus of claim 4 wherein said shaped member includes a truncated conically shaped part.

9. The apparatus of claim 8 wherein said shaped member further includes a dielectric cylindrical part which is juxtaposed with said truncated conical part.

10. The apparatus of claim 3 wherein said coaxial transmission line is disposed in a bottom cylinder and said microwave chamber is disposed in a top cylinder, and wherein said mounting means for said mold, and said mold, are disposed between said bottom and top cylinders.

11. The apparatus of claim 10 further including means disposed in said cylinders for preventing microwave leakage.

12. The apparatus of claim 5 wherein said coupling means comprises a transmission line having a longitudinal transmission axis and having a shape in cross-sectional planes perpendicular to said axis which is similar to the shape of a cross-sectional plane of said article being molded, said transmission line further comprising means for transmitting an electric field which is circumferentially uniform with respect to the transmission element or elements of said line when excited with said generated electromagnetic energy.

13. The apparatus of claim 12 wherein said mold cavity is annular in shape and wherein said transmission line is coaxial and wherein the shape of cross-sectional planes of said coaxial transmission line perpendicular to the axis of said line are circular, said second structure including a field shaping means for maximizing the electric field which is directed through said cavity.

14. The apparatus of claim 2, wherein said coupling end of said transmission line is shaped for directing energy towards said mold cavity.

15. An apparatus for molding articles of thermosetting materials rapidly, uniformly and without the occurence of hot spots or other defects comprising:
   a mold including a mold cavity which conforms to the desired shape of said articles for receiving said thermosetting material,
   means for mounting said mold in said molding apparatus,
   means for generating electromagnetic energy of microwave frequency,
   coaxial transmission line coupling means for causing the electric field component of said generated electromagnetic energy to irradiate said mold cavity uniformly or essentially uniformly throughout its volume, said transmission line coupling means comprising means for transmitting an electric field which is circumferentially uniform with respect to the transmission element or elements of said line when excited with said electromagnetic energy and having a longitudinal transmission axis and comprising a coaxial impedance transformer having conically-shaped inner and outer conductors, said mold cavity being annular in shape and the shape of cross-sectional planes of said coaxial transmission line perpendicular to the axis of said line being circular,
   said transmission line being located on one side of said mold, and a microwave chamber being disposed on the other side of said mold having field shaping means disposed therein for maximizing the electric field which is directed through said cavity.

16. The apparatus of claim 15, wherein said field shaping means comprises a shaped member which is mounted in axial alignment with said transmission line and which provides a termination for electric field lines penetrating through material in said mold cavity.

17. The apparatus of claim 16, wherein said shaped member includes a truncated conically-shaped part.

18. The apparatus of claim 17, wherein said shaped member further includes a dielectric cylindrical part which is juxtaposed with said truncated conical part.

19. The apparatus of claim 18, wherein said coaxial transmission line is disposed in a bottom cylinder and said microwave chamber disposed in a top cylinder, and wherein said mounting means for said mold and said mold, are disposed between said bottom and top cylinders.

20. The apparatus of claim 19 further including means disposed in said cylinders for preventing microwave leakage.

* * * * *